United States Patent [19]

Ackeret

[11] Patent Number: 5,709,328
[45] Date of Patent: Jan. 20, 1998

[54] STORAGE DEVICE FOR AN UMBRELLA FOR INSTALLATION IN A MOTOR VEHICLE

[75] Inventor: Peter Ackeret, Kuesnacht, Switzerland

[73] Assignee: fischerwerke, Artur Fischer GmbH & Co., Waldachtal, Germany

[21] Appl. No.: 552,580

[22] Filed: Nov. 3, 1995

[30] Foreign Application Priority Data

Dec. 23, 1994 [DE] Germany ............... 44 46 158.5

[51] Int. Cl.⁶ .............. B60R 7/14; A47G 25/12; F26B 25/06
[52] U.S. Cl. ............ 224/282; 224/553; 224/557; 224/915; 248/278.1; 211/63; 34/202
[58] Field of Search ................ 224/915, 282, 224/553, 557, 539; 248/278.1; 211/63, 62; 34/202; 200/61.59

[56] References Cited

U.S. PATENT DOCUMENTS

| | | | |
|---|---|---|---|
| 1,585,551 | 5/1926 | Katz | 224/557 |
| 1,955,436 | 4/1934 | Mott | 224/915 |
| 2,939,585 | 6/1960 | Burgin | 248/278.1 |
| 4,570,358 | 2/1986 | Sacerdote | 34/202 |
| 4,807,920 | 2/1989 | Fujiki et al. | |
| 5,584,403 | 12/1996 | Sipperly | 224/915 |

FOREIGN PATENT DOCUMENTS

| | | | |
|---|---|---|---|
| 1094132 | 2/1957 | Germany. | |
| 2357873 | 9/1974 | Germany | 34/202 |
| 2517285 | 10/1976 | Germany. | |
| 78099300 | 3/1978 | Germany. | |
| 3638243 | 8/1986 | Germany. | |
| 9216445 | 3/1992 | Germany. | |
| 5640 | 9/1993 | Japan | 224/282 |
| 6135286 | 5/1994 | Japan | 224/282 |
| 229819 | 11/1943 | Switzerland | 34/202 |
| 553036 | 5/1943 | United Kingdom | 248/278.1 |

*Primary Examiner*—Linda J. Sholl
*Attorney, Agent, or Firm*—Michael J. Striker

[57] ABSTRACT

The storage device for an umbrella includes a quiver-shaped receiving housing (1, 30) provided with an opening (2) at one end for the umbrella (3) and a base wall (4, 34) at another end remote from the one end; a mounting device (18) including a base plate (19) and a mounting pillar (20) having a flange and arranged substantially at right angles to the base plate; and a joint (13) pivotally connecting the receiving housing (1,30) with the mounting means (18) so that the receiving housing (1,30) is pivotable from a stowed-away position (P1) into a swiveled-out position (P2) for insertion and removal of the umbrella (3). The joint (13) has a swivel axis (SA) about which the receiving housing (1,30) pivots and the swivel axis (SA) extends transversely to a receiving housing longitudinal axis (15). This joint (13) is arranged on a side of the base wall (4, 34) opposite from a receiving housing interior and hingedly connects a fixing bolt (14a) to the base wall (4, 34). The fixing bolt (14a) and thus the receiving housing is held rotatably in the flange (21), so that the receiving housing (1,30) is rotatable for easy insertion and removal of the umbrella in spite of limited available space.

20 Claims, 5 Drawing Sheets

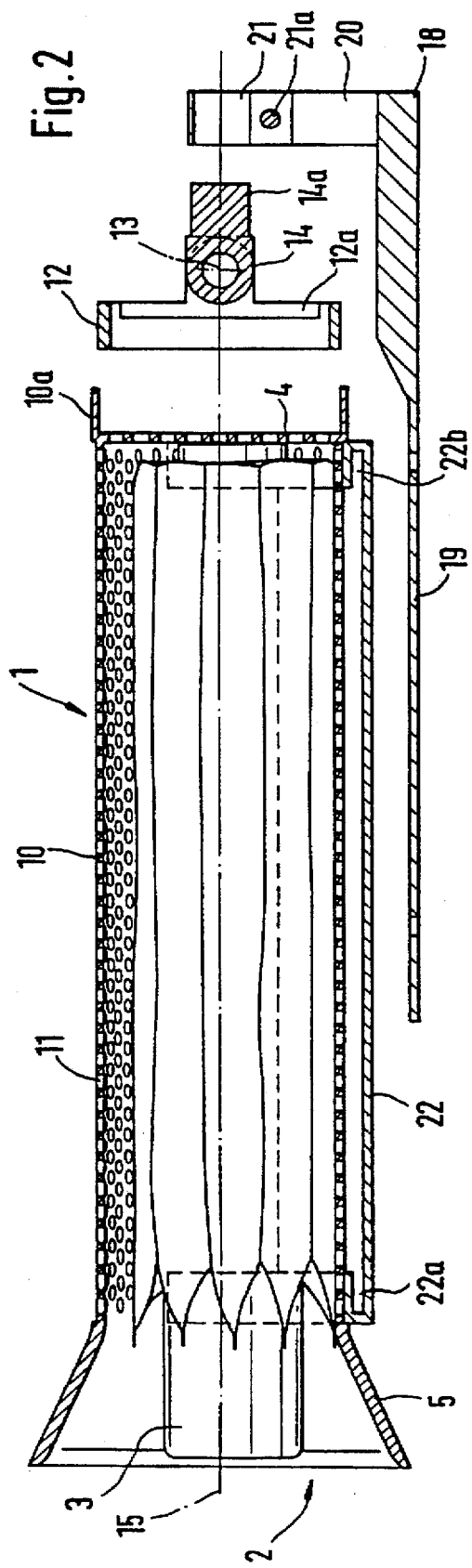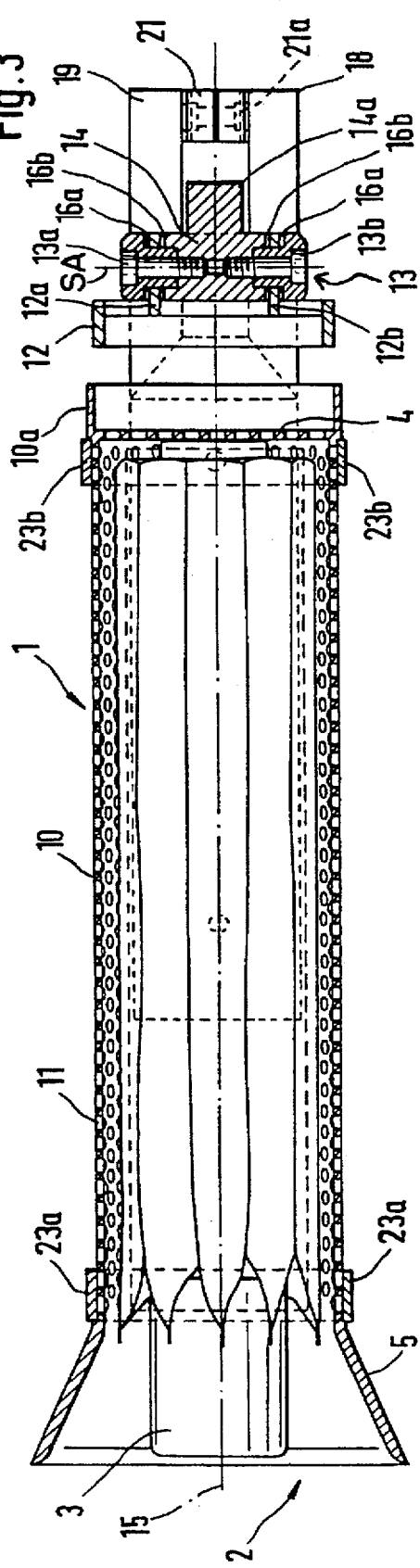

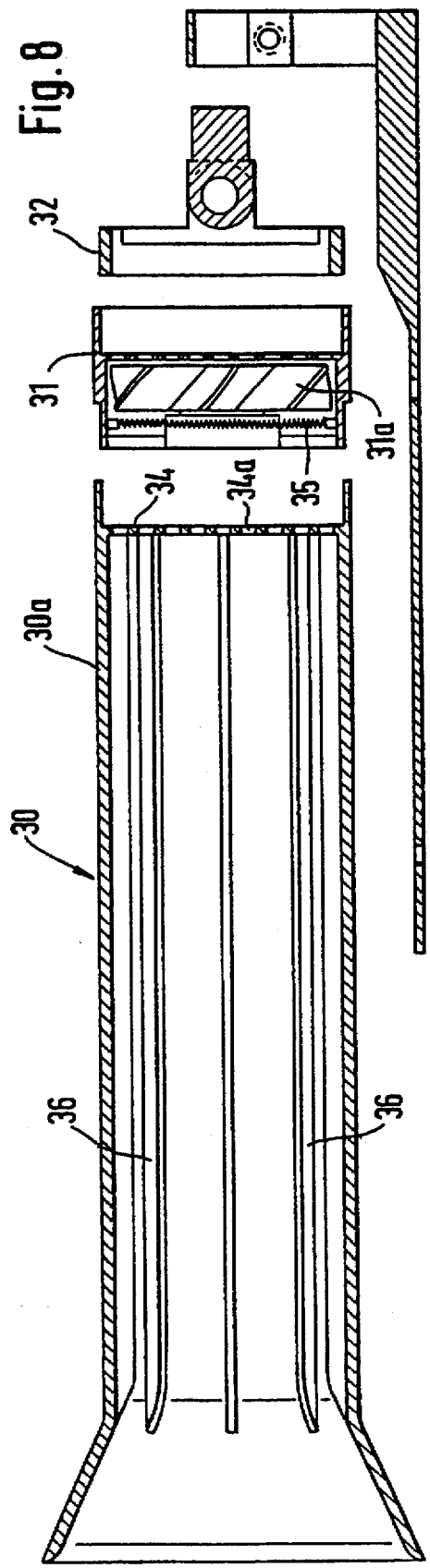
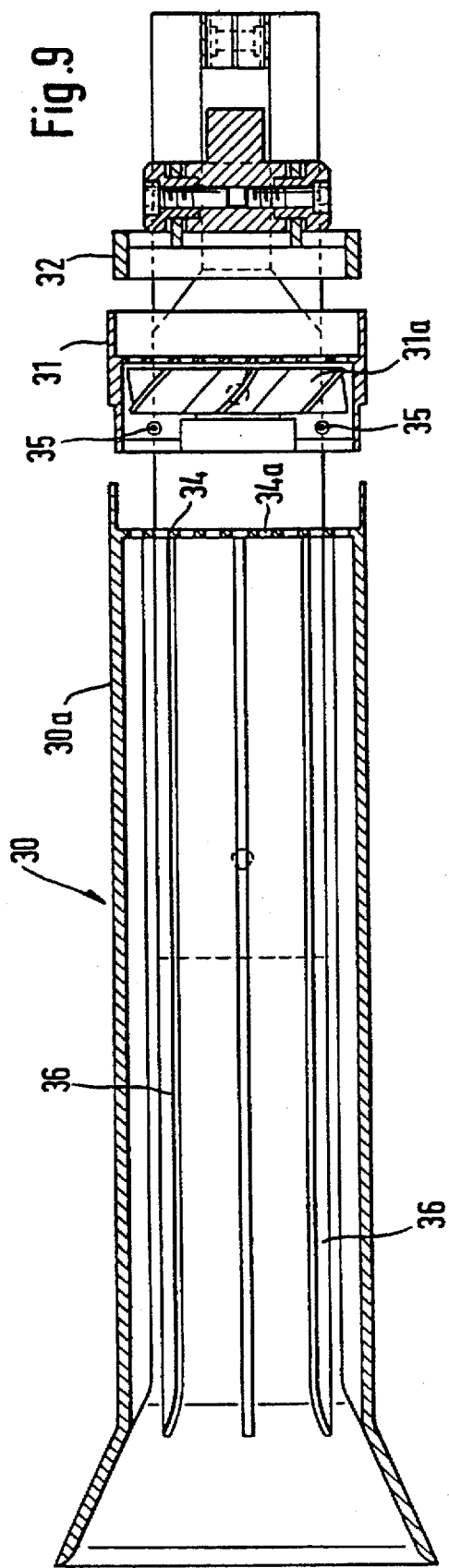

STORAGE DEVICE FOR AN UMBRELLA FOR INSTALLATION IN A MOTOR VEHICLE

BACKGROUND OF THE INVENTION

The present invention relates to a storage device for an umbrella for installation in motor vehicles.

A special place for storing an umbrella is not normally provided in a motor vehicle. Because of their size, umbrellas are generally placed on the rear seat or on the parcel shelf, which is only appropriate if the umbrellas are dry. Wet umbrellas are normally laid on the floor behind the driver or passenger seat or in front of the passenger seat. This is only suitable, however, when the rear seat and passenger seat are not in use. In addition to the risk of damage to an umbrella that is lying on the floor by passengers, especially when they are getting in and out, the carpet also becomes very damp as a result of the drip water, which is undesirable. Wet umbrellas are often, therefore, stored in the trunk which means, however, that the user may be rained on when retrieving the umbrella from the trunk.

It should therefore be possible to store the umbrella in the motor vehicle so that the interior remains protected from getting wet and the umbrella remains protected from damage, dirt and dust.

Furthermore, it should be possible for the user, when in a comfortable sitting position, to remove the umbrella from or place it in the storage device without getting himself or the interior fittings of the motor vehicle wet.

These requirements and the possibility of retrofitting in numerous motor vehicles having widely varying spatial conditions mean that the storage device must, regardless of the motor vehicle, be able to be positioned in a wide range of sites and have highly universal mounting and fixing options and positions for use.

In order to dry a wet umbrella and avoid mould stains, it should also be possible to provide the storage device with, preferably heated, ventilation.

SUMMARY OF THE INVENTION

It is an object of the present invention to provide a storage device, especially for an umbrella, for installation in a motor vehicle, that fulfils the above-described specific requirements and overcomes the above-described problems.

The storage device according to the invention comprises a quiver-shaped receiving housing that has an opening at one end for inserting and removing the umbrella and a base wall at another end remote from the opening, and mounting means for attaching the storage device in the motor vehicle. The receiving housing and the mounting means are connected to one another by a joint arranged in the vicinity of the base wall and extending across the longitudinal axis of the receiving housing.

The shape and size of the storage device are largely predetermined by the umbrella. The options for placing and fixing the elongate, narrow storage device in the motor vehicle are strictly limited as a result.

Furthermore, depending on the mounting position in the motor vehicle, the space required in front of the end-face opening of the storage device for inserting and removing the umbrella is very often non-existent or is obstructed. For that reason the receiving housing and the mounting means may be pivotally connected with each other by the joint so that it is possible to swivel the receiving housing about the joint relative to the mounting means. The receiving housing can then be swivelled from a storage position for holding the stored umbrella which best satisfies the given installation conditions in the motor vehicle to a position in which the required space for easy insertion and removal of the umbrella is available. The possible angle of swivel should be approximately 90° and the receiving housing should be securable in the respective swivel positions by a friction brake, preferably arranged on the joint.

In an especially advantageous embodiment the joint is arranged behind the base wall in such a manner that the longitudinal axis of the receiving housing and the swivel axis of the joint intersect and a cylindrical fixing bolt is arranged behind the joint. This bolt preferably is aligned with the longitudinal axis of the stowed-away receiving housing and is received, so that it is rotatable, in a flange provided on the mounting means. This flange is provided with a locking device, by which the fixing bolt and therefore also the receiving housing can be fixed in the flange in any rotational position.

Since, in this latter embodiment, the fixing plane of the mounting means and the swivelling direction of the receiving housing are continuously adjustable in relation to one another, the swivelling direction of the receiving housing can be selected regardless of the position in which the mounting means has been installed in the motor vehicle, in such a manner that the umbrella can be inserted and removed when the receiving housing is in an optimum position.

For easy assembly and cleaning of the storage device, the receiving housing and the mounting means are preferably constructed so that they can be separated from one another.

The mounting means preferably has an L-shaped cross-section and comprises a mounting pillar, to which the receiving housing can be detachably fixed by means of the joint, preferably behind its base wall, and a base plate that extends, approximately parallel to the longitudinal axis of the stowed-away receiving housing, to the open end face of the housing. The base plate may be mounted in the motor vehicle by screws, adhesive tape or also with corresponding intermediate components.

It is also possible to construct the mounting means so that the storage device could be fixed simply to the floor carpet of the motor vehicle. To do that, a mounting plate corresponding approximately to the size of the base plate, but preferably slightly larger, must be arranged on the reverse side of the floor carpet so that it could be connected to the base plate of the mounting means, for example, by a clamp gripping around the floor carpet at the side or by way of pins that would be pushed through the floor carpet and screwed to the mounting plate so that the floor carpet would be clamped firmly between the base plate and mounting plate.

For optimum adjustment to inclined fixing surfaces, an additional joint should be provided between the base plate and the mounting pillar.

The receiving housing is preferably tubular in shape and is provided at its open end with a funnel-like extension for inserting the umbrella.

For ventilating the umbrella, the circumferential wall, and preferably also the base wall, of the receiving housing should be provided with throughgoing openings distributed as uniformly as possible over the entire surface. The openings are preferably in the form of round holes. That provides the best possible relationship between the stability of the tube and the area of ventilation. Furthermore, the round shape of the ventilation openings prevents the umbrella from becoming caught or damaged when being inserted or removed.

Supports may be provided on the inside of the receiving housing which keep the umbrella at a distance from the outer walls of the receiving housing for better ventilation.

The storage device is preferably fitted with a collecting tray for the drip water from a wet umbrella. It should be arranged on the underside of the receiving housing and should extend approximately along the length thereof.

In a preferred embodiment, the collecting tray, which is designed as a separate component, is arranged to be attached or adjusted on the storage device so that it can be aligned vertically underneath the receiving housing regardless of the position in which the receiving housing has been installed or to which it has been swivelled.

The collecting tray could, for example, be arranged in the form of a segment of a tube constructed concentrically with the receiving housing to be attachable to the receiving housing from the outside and connected to it so as to be rotatable. This, however, requires the receiving housing to be provided with suitably arranged water drains that allow the drip water to flow downwards in any installed position. It would, of course, also be possible to construct the receiving housing with no openings on a portion of the circumference of its circumferential wall and in that manner to collect the drip water directly in the receiving housing. In this embodiment however supports should be arranged in the region of the closed circumferential surface of the receiving housing which support the umbrella above the collected drip water. Furthermore, in this embodiment the receiving housing should be arranged to be rotatable about its longitudinal axis in relation to the joint and thus the collecting region for the drip water should be able to be directed downwards regardless of the particular position in which the receiving housing has been installed or to which it has been swivelled.

In order to dry a wet umbrella better, the storage device could finally also be provided with a, preferably heated, drying device. This could be arranged on the receiving housing, preferably behind the base wall, in which case the base wall would then need to be provided with suitably large ventilation holes. In order to prevent the drying air that is blown through the base wall from escaping to the sides and to achieve optimum drying of the umbrella, the circumferential surfaces of the receiving housing should, in that embodiment, have no openings and supports should be arranged on the inner sides of the circumferential surfaces so that the drying air circulates around the entire outside of the umbrella.

Power for a drying device could be provided by means of the motor vehicle's electrical system. Activation of the power supply occurs preferably on insertion of the umbrella into the receiving housing and deactivation, by means of a timer switch.

BRIEF DESCRIPTION OF THE DRAWING

Further features and advantages of the invention follow from the appended claims and the description of preferred embodiments of the invention which are explained hereinafter with reference to the attached drawings, in which, in diagrammatic form:

FIG. 2 is a vertical longitudinal cross-sectional view through the storage device according to the embodiment of FIG. 1;

FIG. 3 is a horizontal longitudinal cross-sectional view through the storage device according to FIGS. 1 and 2;

FIG. 8 is a vertical longitudinal cross-sectional view of a second embodiment of the storage device, FIG. 9 is a horizontal longitudinal cross-sectional view of the storage device according to the embodiment of FIG. 8.

DESCRIPTION OF THE PREFERRED EMBODIMENTS

Figure 1:
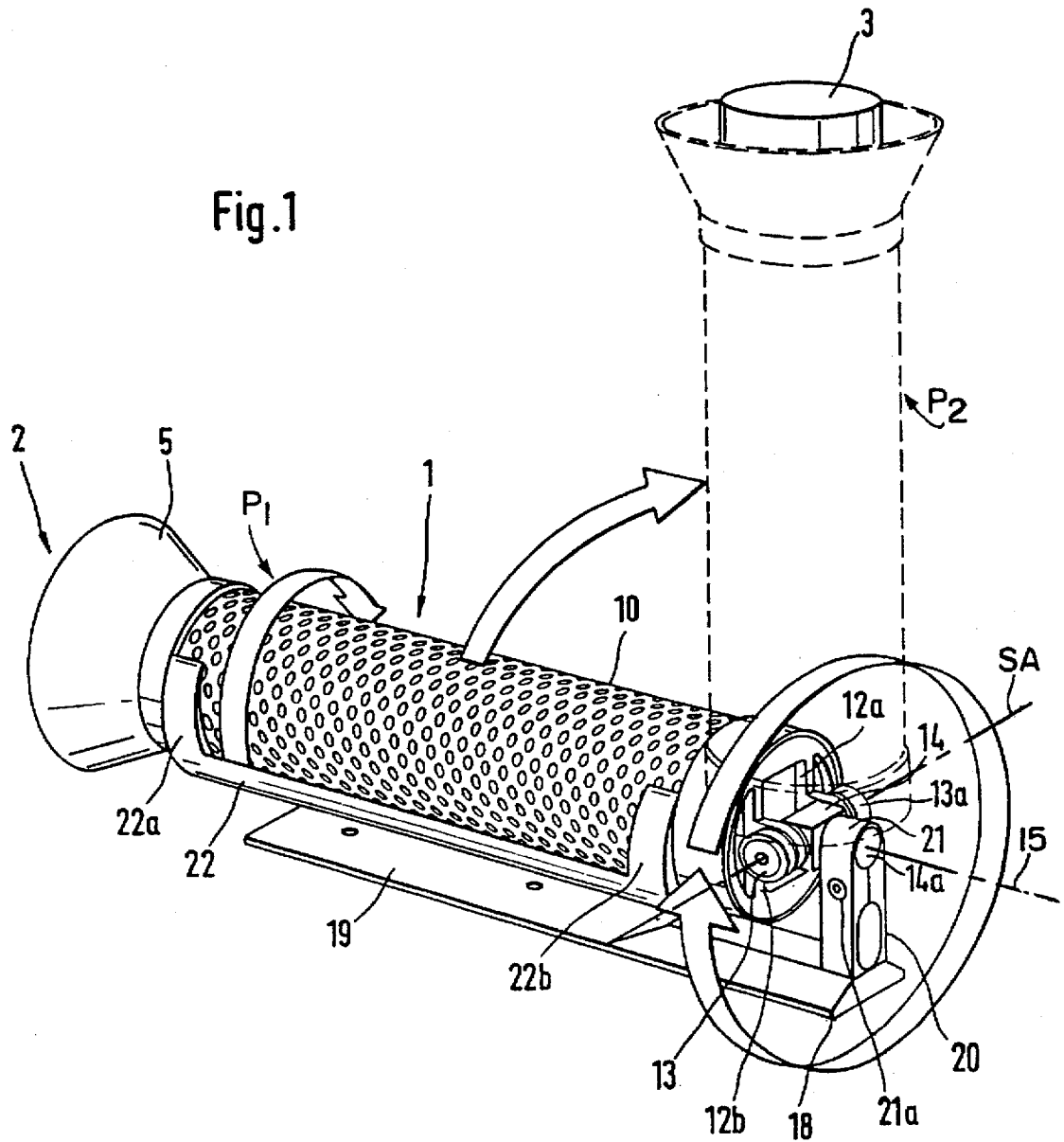
FIG. 1 is a perspective view of a first embodiment of the storage device for an umbrella according to the invention showing the receiving housing in a stowed-away position for storage and in a swivelled-out position.

A first embodiment of the storage device for an umbrella is shown in FIGS. 1 to 3.

The receiving housing 1 is in the form of a tube having a round cross-section. At one end the receiving housing 1 has an opening 2 through which the umbrella 3 is for inserted and removed, while at the other end remote from the opening 2 it is closed by the base wall 4. A circumferential wall 10 extends between the opening 2 and the base wall 4. As an aid for an insertion of the umbrella 3, the receiving housing 1 is provided at its open end near opening 2 with a funnel-shaped extension 5 connected to the circumferential wall 10. For ventilating the receiving housing 1, through-going openings 11 in the form of round holes are provided in the circumferential wall 10.

The circumferential wall 10 extends beyond the base wall 4. A wall extension 10a is provided which receives and fixes a swivel head 12, to which a bearing block 14 is hingedly mounted via joint 13 including joint screws 13a, 13b. The cylindrical fixing bolt 14a is arranged on the bearing block 14 and is aligned with the longitudinal axis 15 of the stowed-away receiving housing 1 in the stowed-away position $P_1$.

The swivel head 12 and the bearing block 14 are connected to one another by means of two struts 12a, 12b and the joint screws 13a, 13b. Friction brakes 16a, 16b being inserted between the struts 12a, 12b, on the one hand, and the joint screws 13a, 13b and the bearing block 14, on the other hand. The friction brakes 16a, 16b can fix the receiving housing 1 continuously variably in any swivelled-out position $P_2$, i.e. in any rotational orientation.

The mounting means 18 is a mounting device with an L-shaped cross-section and comprises base plate 19, which runs parallel to the longitudinal axis 15 of the stowed-away receiving housing 1, and mounting pillar 20, which is arranged at right angles on the base plate 19. The flange 21 is provided on the mounting pillar 20 for receiving the fixing bolt 14a. It is possible for the fixing bolt to be adjusted in the flange 21 by rotation to any desired position of rotation and to be fixed by means of the locking device 21a.

The swivel head 12, the struts 12a, 12b, the bearing block 14, the fixing bolt 14a, the mounting pillar 20 and the flange 21 are constructed so that the receiving housing 1 can be moved in relation to the mounting means 18 in any position of rotation (except, of course, in the direction of the base plate 19) through approximately 90°.

A collecting tray 22 for water which drips from a wet umbrella is provided in the form of a tubular segment structured and arranged concentrically with the receiving housing 1 and is attached to the latter from the outside by means of clamps 23a, 23b and is mounted to be rotatable about the longitudinal axis 15 thereof.

As a result, the collecting tray 22 may be rotated about the circumferential wall 10 to any desired position and may be separated without difficulty from the receiving housing 1 for the purposes of assembly and cleaning.

The collecting tray 22 extends from the base wall 4 to the funnel-like extension 5 and is provided at its end edges with pocket-shaped hollow areas 22a, 22b, in which the drip water that has collected in the collecting tray 22 is caught when the receiving housing 1 is swivelled about the joint 13.

FIGS. 4 to 7 show four examples of variants for the installation of the storage device according to the embodiment of FIGS. 1 to 3.

Figure 4:
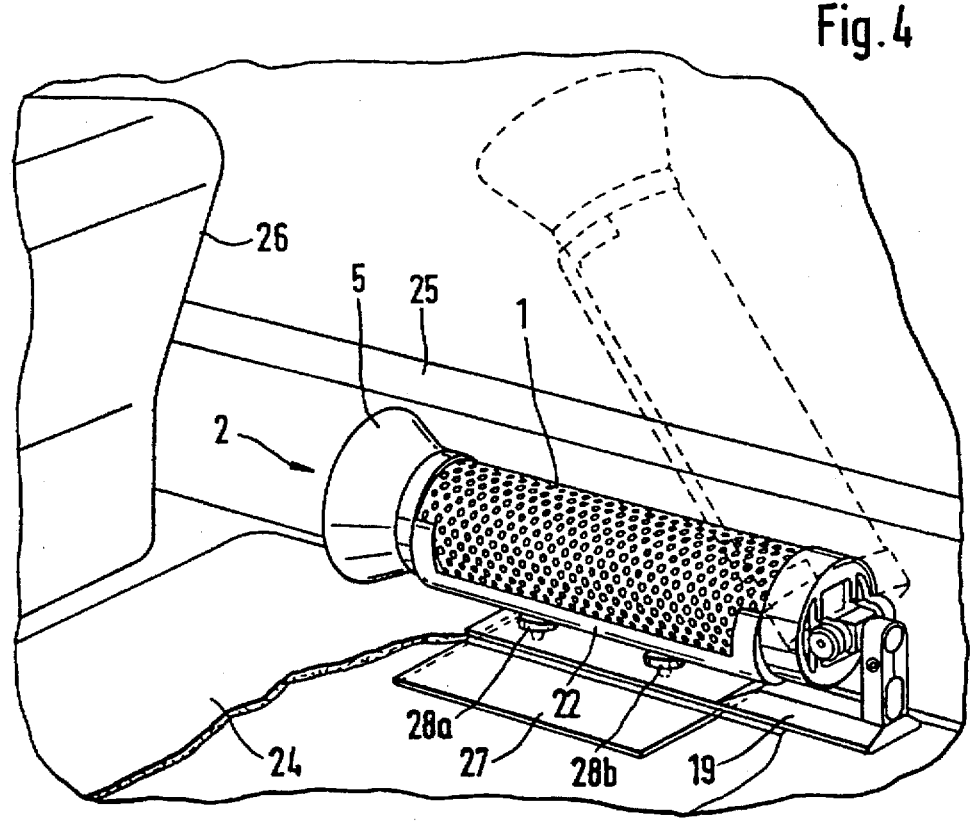
FIG. 4 is a perspective view of a first variant for installation of the storage device according to FIGS. 1 to 3.

FIG. 4 shows a first installation variant wherein the storage device is fixed to the floor carpet 24 of the motor vehicle. The storage device is attached next to the door sill 25 approximately parallel thereto in front of the vehicle seat 26 in the motor vehicle. A mounting plate 27 is arranged underneath the floor carpet 24 and facing the base plate 19. The mounting plate 27 is screwed to the base plate 19 by screws 28a, 28b, which are pushed through the floor carpet 24. The floor carpet 24 is thus clamped firmly between the base plate 19 and the mounting plate 27 and is reinforced so that the receiving housing 1 can be swung upwards until it is possible to insert and remove the umbrella past the vehicle seat 26 without difficulty. To clean the floor carpet 24, the storage device can be removed without difficulty by undoing the screws 28a, 28b. This type of mounting can be provided in principle anywhere on the floor carpet.

Figure 5:
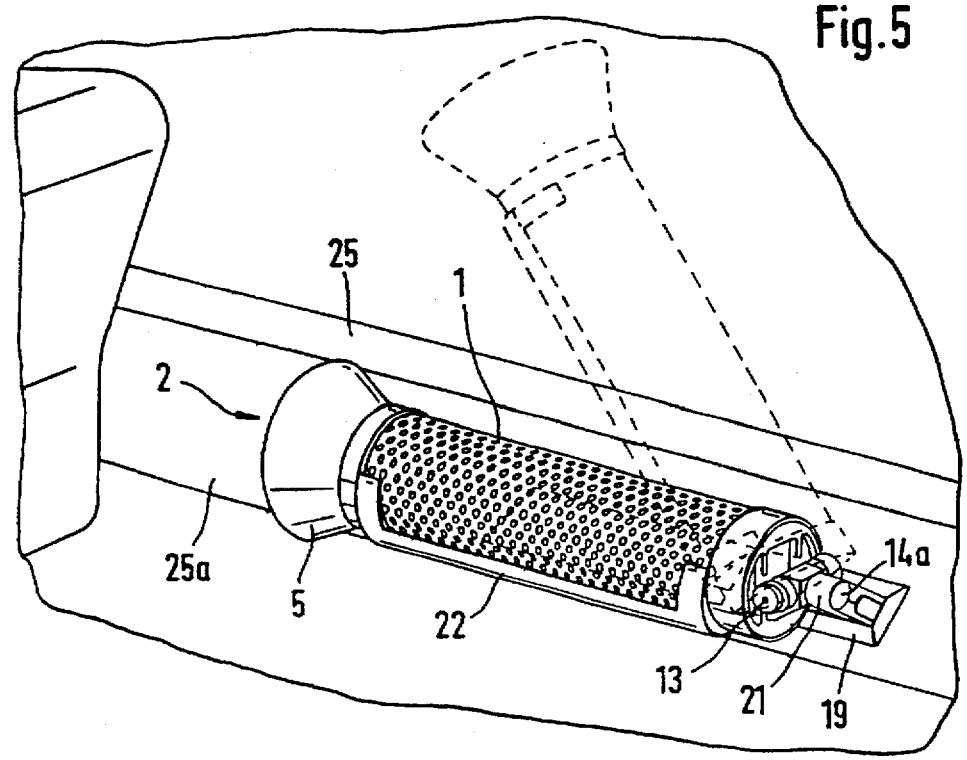
FIG. 5 is a perspective view of a second variant for installation of the storage device according to FIGS. 1 to 3.

In FIG. 5, the base plate 19 is screwed firmly to the inclined inner wall 25a of the door sill 25. So that the receiving housing 1 can be swung out in a vertical plane, the fixing bolt 14a must be rotated in the flange 21 until the swivel axis SA of the joint 13 is lying horizontal to compensate for the inclined position of the inner wall 25a.

Figure 6:
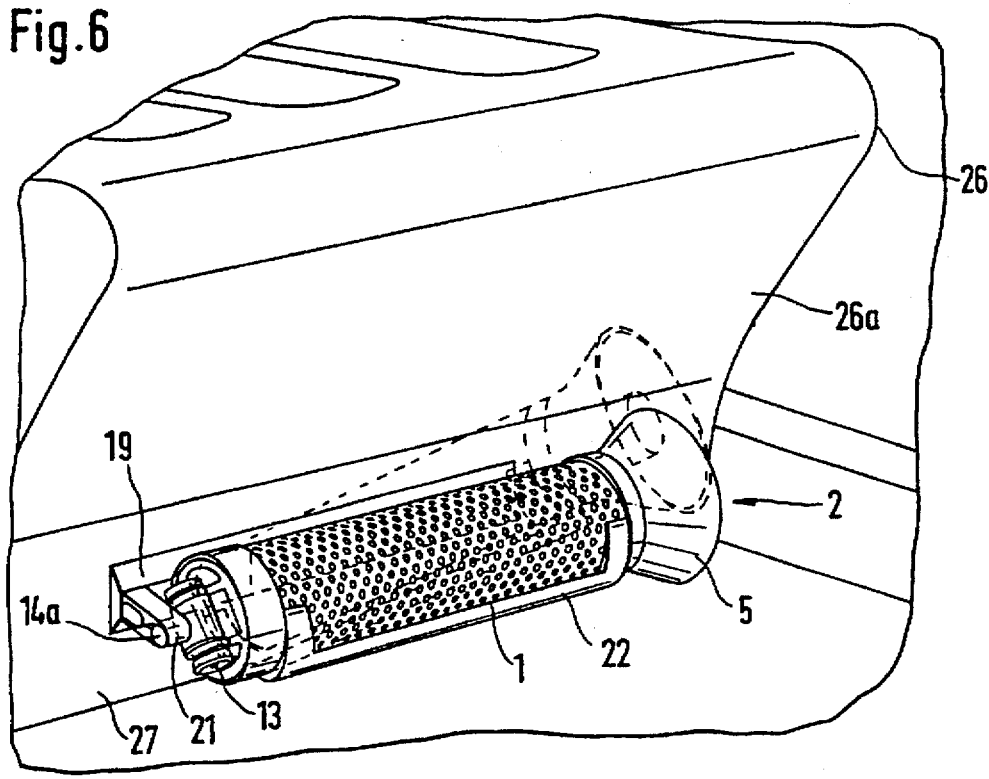
FIG. 6 is a perspective view of a third variant for installation of the storage device according to FIGS. 1 to 3.

In FIG. 6, the base plate 19 is attached to the perpendicular plinth 27 of the vehicle seat 26. So that the receiving housing 1 can be swivelled up past the forwardly inclined face 26a of the vehicle seat 26, the fixing bolt 14a must be rotated in the flange 21 so that the swivel axis SA of the joint 13 lies approximately perpendicular to the face 26a. To compensate for that inclined position, the collecting tray 22 must be rotated forwards to a perpendicular position beneath the receiving housing 1.

Figure 7:
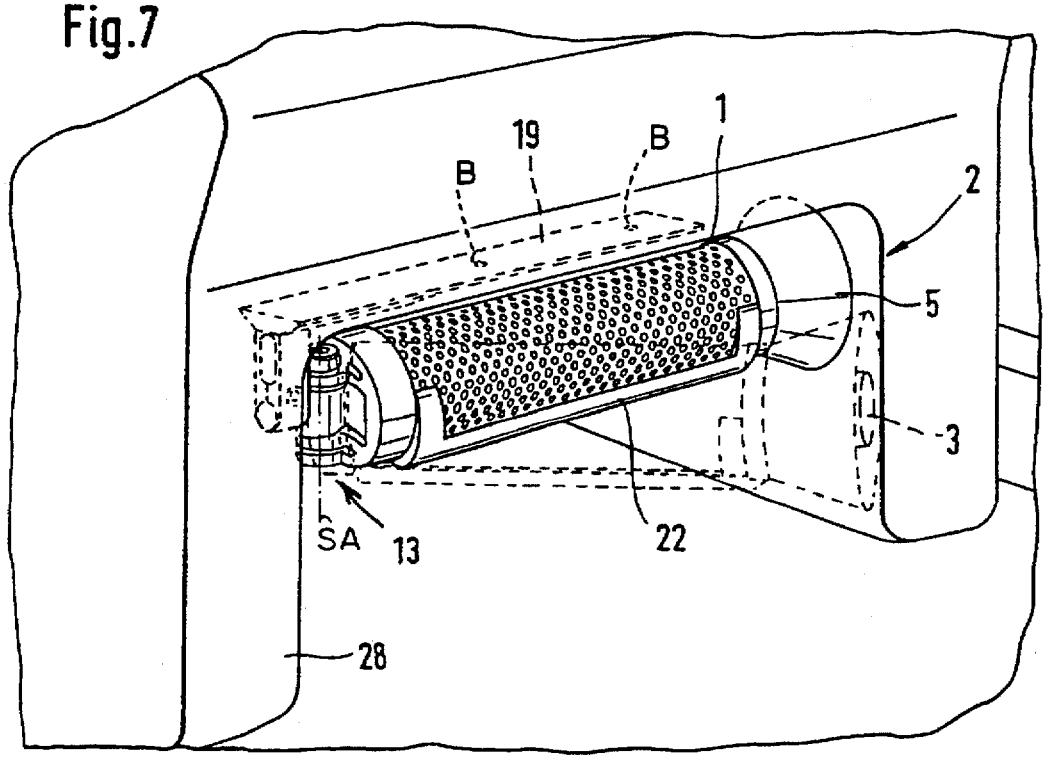
FIG. 7 is a perspective view of a fourth variant for installation of the storage device according to FIGS. 1 to 3.

Finally, FIG. 7 shows an installation variant in which the base plate 19 is suspended on the underside of the seat 28. So that the receiving housing 1 can be swivelled out forwards into a swivelled-out position $P_2$ for inserting and removing the umbrella 3, the axis 13 of the joint must be rotated to a perpendicular position through approximately 90° in relation to the base plate 19. To compensate for that rotation of the receiving housing 1, the collecting tray 22 must also be rotated through 90° so that it is positioned underneath the receiving housing 1.

FIGS. 8 and 9 show a second embodiment of the storage device which corresponds in principle to the embodiment shown in FIGS. 1 to 3 but is additionally provided with a heated drying device for the umbrella.

The drying device 31 is inserted between the receiving housing 30 and the swivel head 32. The drying device contains a fan 31a which draws air, warmed by the heating device 35, through the swivel head 32 which is open to the rear and blows it into the receiving housing 30 through the base wall 34, which is provided with ventilation holes 34a.

So that the drying air that is blown in does not escape to the sides and the umbrella can be dried as well as possible, in this second embodiment no openings are provided in the circumferential wall 30a and supports 36 are provided which keep the umbrella at a distance from the circumferential wall 30a and thus ensure circulation of the drying air around the entire outside of the umbrella.

By "behind" the base wall 4,34 of the receiving housing 1,30 is meant the region on the opposite side of the base wall from the interior of the receiving housing in which the umbrella 3 is accommodated.

While the invention has been illustrated and described as embodied in a storage device for an umbrella for installation in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A storage device for an umbrella in a limited space, said storage device comprising a quiver-shaped receiving housing (1, 30) having a longitudinal axis (15), provided with an opening (2) at one end for inserting and removing an umbrella (3) and having a base wall (4, 34) at another end remote from said one end;

mounting means (18) for securing the receiving housing (1, 30), said mounting means comprising a base plate (19) and a mounting pillar (20) arranged substantially at right angles to the base plate, said mounting pillar (20) including a flange (21); and a joint (13) pivotally connecting the receiving housing (1, 30) with the mounting means (18) so that the receiving housing (1, 30) is pivotable from a stowed-away position (P1) into at least one swiveled-out position (P2) for insertion and removal of the umbrella (3) to and from the receiving housing (1, 30);

wherein said joint (13) has a swivel axis (SA) about which said receiving housing (1,30) pivots and said swivel axis (SA) extends transversely to the longitudinal axis (15) of the receiving housing (1, 30), said joint (13) is arranged on a side of said base wall (4, 34) opposite from an interior of the receiving housing (1, 30) and hingedly connects a fixing bolt (14a) to the base wall (4, 34) and said fixing bolt (14a) is held rotatably in said flange (21) of said mounting means, so that said receiving housing (1, 30) and said joint (13) are rotatable in order to facilitate insertion and removal of the umbrella in spite of limited available space.

2. The storage device as defined in claim 1, wherein said fixing bolt (14a) is cylindrical and is aligned with the longitudinal axis (15) when the receiving housing (1, 30) is in the stowed-away position ($P_1$).

3. The storage device as defined in claim 1, further comprising a locking device (21a) arranged on the flange (21), said locking device (21a) comprising means for fixing said fixing bolt (14a) in the flange (21) in any rotational position.

4. The storage device as defined in claim 1, further comprising a friction brake (16a, 16b) for the joint (13) and wherein said friction brake (16a, 16b) includes means for fixing said receiving housing in said at least one swiveled-out position (P2).

5. The storage device as defined in claim 1, wherein the receiving housing (1, 30) is pivotable relative to the mounting means (18) about the swivel axis (SA) through an angle of approximately 90°.

6. The storage device as defined in claim 1, wherein the receiving housing (1, 30) has a funnel-like extension (5) provided at the opening (2) of the receiving housing (1, 30).

7. The storage device as defined in claim 1, wherein the receiving housing (1) is tubular, has a round cross-section and has a circumferential wall (10) extending between the opening (2) and the base wall (4) and said circumferential wall (10) is provided with a plurality of throughgoing openings (11).

8. The storage device as defined in claim 7, further comprising a collecting tray (22) for drip water from the umbrella (3) arranged on the receiving housing (30) outside of the receiving housing.

9. The storage device as defined in claim 8, wherein the receiving housing (1) and the collecting tray (22) are movable in relation to one another.

10. The storage device as defined in claim 8, wherein the collecting tray (22) is in the form of a tubular segment and is arranged concentric with the receiving housing (1), the collecting tray (2) is attachable to the receiving housing (1) from the outside and is rotatably connected to the receiving housing (1) so as to be rotatable about said longitudinal axis (15).

11. The storage device as defined in claim 1, wherein the receiving housing (30) is tubular with a round cross-section and has an at least partially closed circumferential wall (30a) and a support (36) in the receiving housing (30), said support (36) spacing the umbrella (3) from the circumferential wall (30a) when the umbrella (3) is in the receiving housing (30).

12. The storage device as defined in claim 1, wherein the base plate (19) extends substantially parallel to the longitudinal axis (15) when the receiving housing is in the stowed-away position (P1), and the mounting means (18) comprises means for fixing the base plate (19) to a floor carpet (24) including a mounting plate (27) extending parallel to the base plate (19) with the floor carpet (24) extending between the base plate (19) and the mounting plate (27) and means (28a, 28b) for securing the base plate (19) and the mounting plate (27) to each other and for pressing the floor carpet (24) between the base plate and the mounting plate.

13. The storage device as defined in claim 12, wherein the means (28a, 28b) for securing and for pressing comprises pins, said pins extend through the floor carpet (24) and are connected in a non-interlocking manner to the base plate (19) and the mounting plate (27).

14. The storage device as defined in claim 12, wherein the means (28a, 28b) for securing and for pressing are screws and the floor carpet is a motor vehicle floor carpet in a motor vehicle.

15. The storage device as defined in claim 1, wherein said mounting means (18) includes means (B) for fixing the storage device to a vehicle seat (26) of a motor vehicle.

16. The storage device as defined in claim 1, further comprising a fan (31a) for ventilating the receiving housing (1, 30) with air.

17. The storage device as defined in claim 16, wherein the fan (31a) is arranged behind the base wall (4, 34) and the base wall (34) is provided with a plurality of throughgoing holes (34a) for said air drawn in by the fan.

18. The storage device as defined in claim 17, wherein the fan (31a) is arranged between the base wall (34) and the joint (13).

19. The storage device as defined in claimed 16, further comprising means (35) for heating said air drawn in by said fan.

20. The storage device as defined in claim 16, further comprising means for activating said fan (31a) on insertion of the umbrella (3) into the receiving housing (1, 30) and means for deactivating said fan (31a) including a timer switch.

* * * * *